Figure 1:
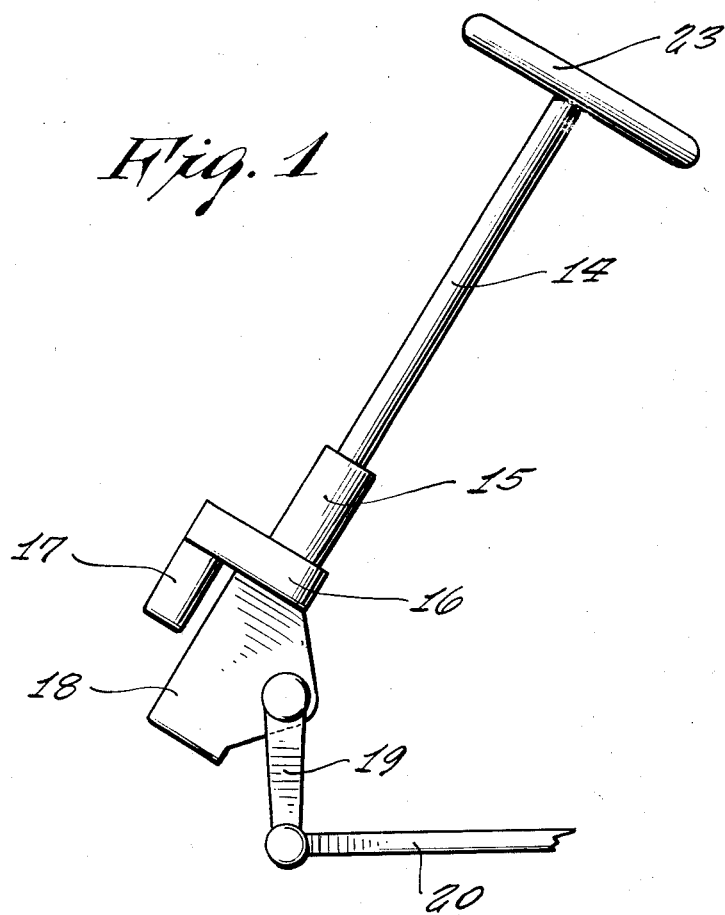

Nov. 10, 1959 W. SCHMIDT 2,911,850
LINKAGE FOR VEHICLE POWER DRIVES
Filed March 12, 1957 2 Sheets-Sheet 1

INVENTOR.
WILLI SCHMIDT

Nov. 10, 1959  W. SCHMIDT  2,911,850
LINKAGE FOR VEHICLE POWER DRIVES
Filed March 12, 1957  2 Sheets-Sheet 2

INVENTOR.
WILLI SCHMIDT
BY

United States Patent Office 2,911,850
Patented Nov. 10, 1959

2,911,850

LINKAGE FOR VEHICLE POWER DRIVES

Willi Schmidt, Frankfurt am Main, Germany, assignor to Alfred Teves Maschinen- und Armaturenfabrik K.G., Frankfurt am Main, Germany Application March 12, 1957, Serial No. 645,453

Claims priority, application Germany April 24, 1956

1 Claim. (Cl. 74—526)

The present invention relates to vehicle power drives and more particularly to improved linkages for such drives.

It is a known fact that in conventional power drives during operation one of the tie rods strikes the axle or the vehicle frame. Such limitation of the turning range results in high stress on the tie rods, leading eventually to their distortion or sometimes even to more serious damage. Thus it is at least necessary to provide reinforced stops capable of resisting the higher stress imposed.

It is the object of the present invention to provide a power drive arrangement which will overcome the above mentioned disadvantages of known devices.

In order to prevent overstress on the tie rods, a power drive for vehicles is provided according to the invention in which a stop is so arranged between the steering wheel and control valve that the tie rod is prevented from striking the axle or the frame of the vehicle.

Thus, upon the increase of torque at the instant of the extreme turning of the steering wheel, the action of a force upon the control valve is avoided. This is an improvement over the known steering devices in which such force is actually exerted at that instant on the control valve, effecting a simultaneous increase in force at the tie rod which, in turn, causes a load increase on the tie rod supports, i.e. the axle or frame of the vehicle.

According to the invention the limitation of the movement of the steering wheel may be brought about by arranging a stop ring on the drive shaft portion lying between the steering wheel and the control valve; the stop ring is positively connected with the drive shaft and axially adjustable in the casing. The axial movement is limited by two limiting rings arranged in the casing, one at each side of the stop ring. The stop ring as well as the limiting rings have external threads which are capable of engagement with an internal thread provided in the casing wall. In order to secure the limiting rings against turning after they have been placed in proper position, set screws are provided which will also assure either gradual or stepwise adjustment. By making the limiting rings adjustable, the turning range of the steering wheel may be likewise adjusted, so that the steering device may be used for different types of vehicles without change of construction.

The device according to the invention will be more fully described with reference to the accompanying drawing, but it should be understood that this is given by way of illustration and not of limitation and that many changes in the details can be made without departing from the spirit of the invention.

Figure 2:
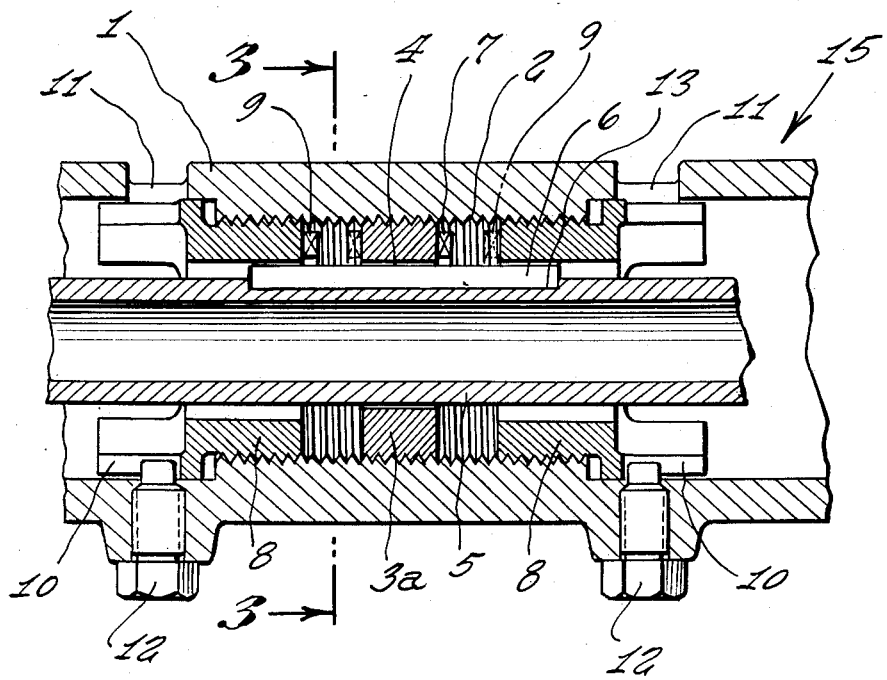
Figure 3:
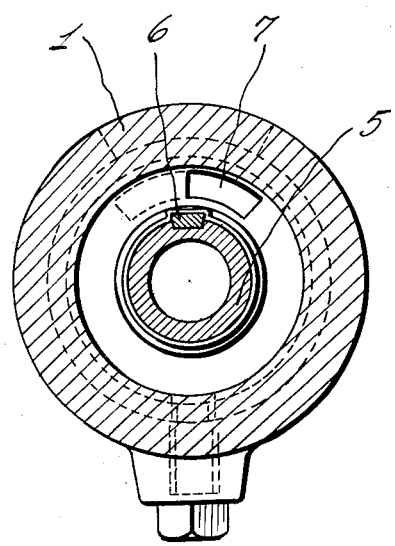

In the drawings:

Fig. 1 is a diagrammatic view of the device according to the invention connected to other parts of the vehicle, Fig. 2 is a longitudinal section through the device according to the invention and Fig. 3 is a section along 3—3 of Fig. 2.

Referring now to Fig. 1, the steering wheel of a vehicle is designated by 23, the steering rod by 14. The rod is directly connected to the limiting device 15 which is attached to a casing 16 for a lever which transmits the rotation of the wheel 23 to the control valve 17. The steering mechanism is connected to the tie rod 20 by means of a lever 19, which is journalled to a housing 18.

The cylinder controlling the power drive is not shown in the drawing, since it may be connected to different elements of the linkage; preferably the connection is so made as to directly act on the lever 19.

Figs. 2 and 3 are detailed showings of the limiting device 15. The latter comprises a casing 1 fixed for rotation with the drive shaft to the drive gear (not shown) and housing the drive shaft 5. The casing 1 is provided with an internal thread 2 which is in engagement with an externally threaded stop ring 3a; a positive connection between ring 3a and shaft 5 is brought about by a member 6 which is fitted into a recess 13 in shaft 5 and engages with a groove 4 in ring 3a; upon rotation of the drive shaft the stop ring will, therefore, be turned in one direction or the opposite direction and will thus be axially displaced. Two limiting rings 8 having external threads, are, moreover, screwed into casing 1, one ring 8 at each side of ring 3a. This ring has projections 7 at both ends, and rings 8 each have a projection 9 at the end facing ring 3a. Both rings 8 are adjustable. For such adjustment, the casing has slots 11, through which the rings 8 are easily accessible and may be screwed further into the casing or out of the same, as the case may be. After adjustment of the rings 8 to the proper operating range, they are secured in position by means of set screws 12, which engage with axially disposed grooves 10 of the peripheries of rings 8.

The limiting rings 8 and stop ring 3a are so adjusted with respect to each other that the tie rod will be stopped from striking the axle of the vehicle or the vehicle frame, since in either direction of the rotating drive shaft the stop ring 3a will strike one of the limiting rings 8 before striking of the tie rod can occur. Thus upon further increase of the torque at the steering wheel no force is exerted on the control valve and on the tie rod. An overstressing of the tie rod is thereby safely avoided.

What I claim is:

An improved linkage for power drives for vehicles provided with a steering wheel including a drive shaft actuated by said steering wheel, a casing for said drive shaft, said casing provided with internal threads, and means for limiting the turning range of said steering wheel comprising a stop ring positively connected to said drive shaft and axially movable with respect to said casing, said stop ring provided with external threads engaging with the internal threads of said casing, a limiting ring arranged in the casing at each side of the stop ring for restricting the movement thereof, said limiting ring provided with external threads engaging with the internal threads of said casing, and means for adjusting the position of said limiting rings, the turning range of said steering wheel being determined by the position of said limiting rings.

References Cited in the file of this patent

UNITED STATES PATENTS

| | | |
|---|---|---|
| 1,763,470 | Lemon | June 10, 1930 |
| 2,775,133 | Armantrout | Dec. 25, 1956 |
| 2,833,154 | Barnes et al. | May 6, 1958 |

FOREIGN PATENTS

| | | |
|---|---|---|
| 1,088,677 | France | Sept. 15, 1954 |